(12) United States Patent
Yamaji et al.

(10) Patent No.: US 8,246,087 B1
(45) Date of Patent: Aug. 21, 2012

(54) FLUID COUPLING

(75) Inventors: Michio Yamaji, Osaka (JP); Tsutomu Shinohara, Osaka (JP); Nobukazu Ikeda, Osaka (JP)

(73) Assignee: Fujikin Incorporated, Osaka (JP)

( * ) Notice: Subject to any disclaimer, the term of this patent is extended or adjusted under 35 U.S.C. 154(b) by 1789 days.

(21) Appl. No.: 09/437,296

(22) Filed: Nov. 9, 1999

(30) Foreign Application Priority Data

Nov. 11, 1998 (JP) ..................................... 10/320737

(51) Int. Cl.
*F16L 17/00* (2006.01)
(52) U.S. Cl. ........................................ 285/379; 285/328
(58) Field of Classification Search .................. 285/379, 285/917, 368, 328; 277/609, 614, 616, 637, 277/641
See application file for complete search history.

(56) References Cited

U.S. PATENT DOCUMENTS

| | | | | |
|---|---|---|---|---|
| 5,058,935 A | * | 10/1991 | Eidsmore | 285/330 |
| 5,433,454 A | * | 7/1995 | Ramberg | 277/614 |
| 5,505,464 A | | 4/1996 | McGarvey | |
| 5,904,381 A | * | 5/1999 | Ohmi et al. | 285/328 |
| 5,967,489 A | * | 10/1999 | Nakazawa et al. | 251/148 |
| 6,039,319 A | * | 3/2000 | Coonce et al. | 277/614 |
| 6,073,969 A | * | 6/2000 | Zimmerly | 285/328 |
| 6,145,888 A | * | 11/2000 | Ohmi et al. | 285/328 |

FOREIGN PATENT DOCUMENTS

| | | |
|---|---|---|
| EP | 0 837 277 A2 | 4/1998 |
| EP | 0 846 995 A2 | 6/1998 |
| EP | 0 859 155 A2 | 8/1998 |

* cited by examiner

*Primary Examiner* — Aaron Dunwoody
(74) *Attorney, Agent, or Firm* — Kratz, Quintos & Hanson, LLP

(57) ABSTRACT

Coupling members each have a fluid channel having an opening passageway orthogonal to an abutting end face of the coupling member, and a slanting main passageway communicating with the opening passageway. The opening passageway has diameter equal to the inside diameter of a gasket holding annular ridge of the coupling member. A gasket has an inside diameter smaller than the diameter of the opening passageway.

1 Claim, 4 Drawing Sheets

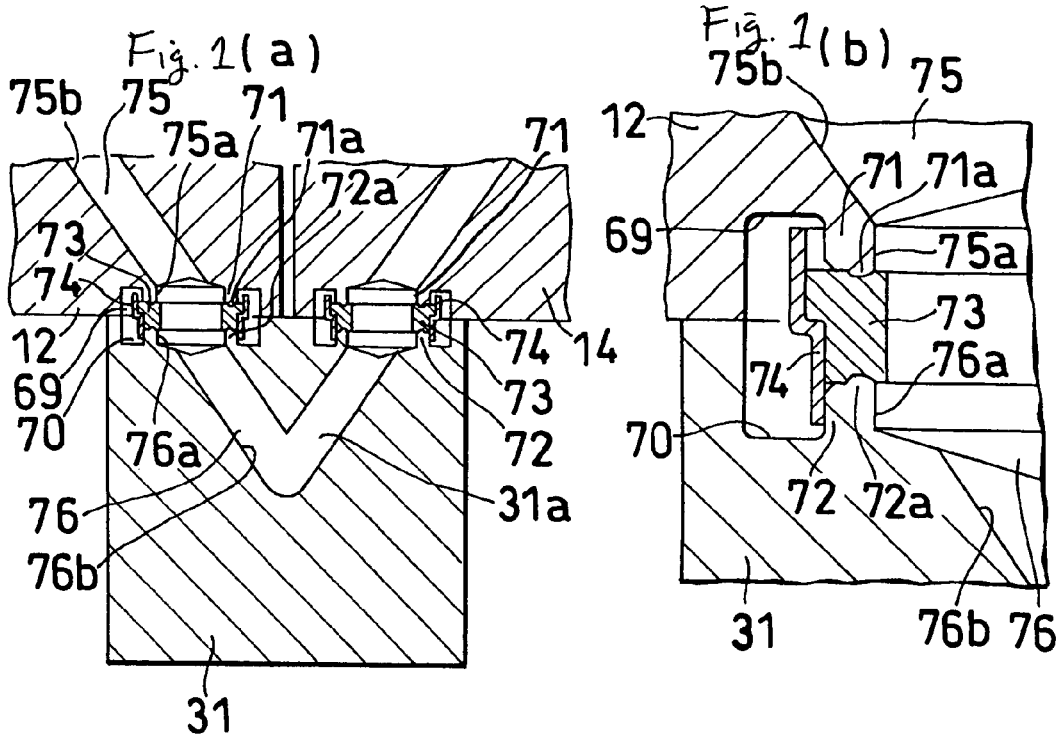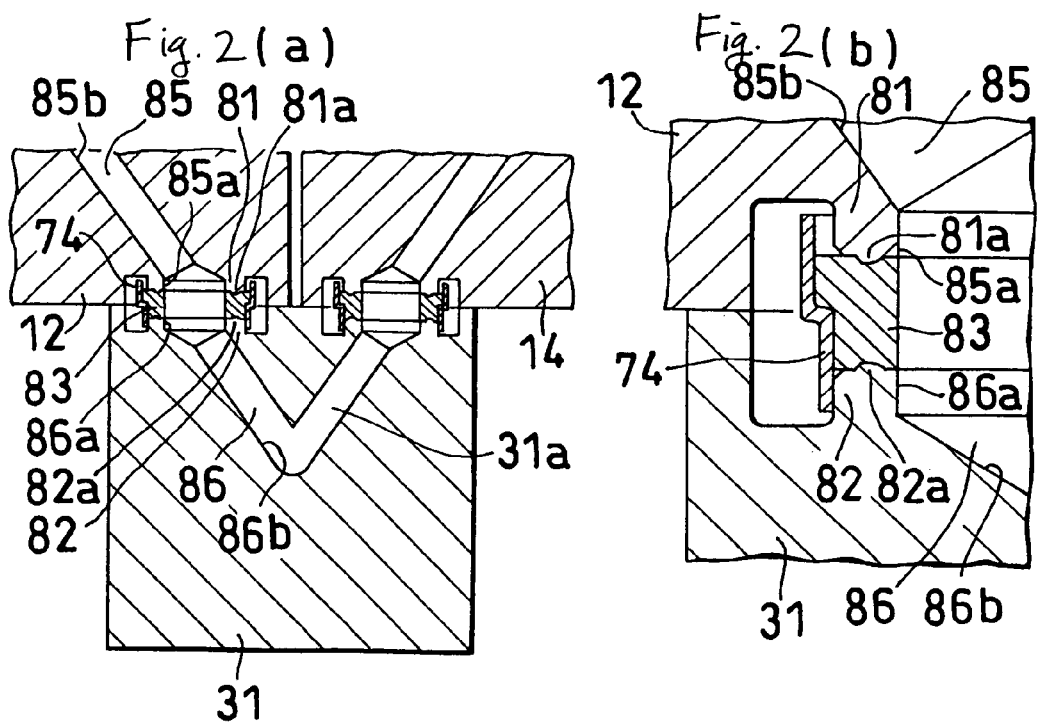

FLUID COUPLING

BACKGROUND OF THE INVENTION

The present invention relates to fluid couplings, and more particularly to those having a fluid channel which is inclined with respect to a direction orthogonal to the opposed end faces of the component coupling members of the coupling.

Fluid couplings are already known which comprise first and second coupling members each having a gasket holding annular ridge on a butting end face thereof, and an annular gasket interposed between the two coupling members. The conventional fluid couplings are generally so constructed that the flow channel of each coupling member is orthogonal to the butting end face.

For use in semiconductor manufacturing equipment or the like, we have proposed a fluid control apparatus 4 which comprises a massflow controller 3 and shutoff-opening devices 1, 2 provided respectively at the left side and right side of the massflow controller 3 as shown in FIG. 7. Each of the shutoff-opening devices 1, 2 comprises a plurality of valves 6, 7 (8, 9, 10) each having an inlet and an outlet in a lower surface thereof, and a valve mount 28 (29) having the valves 6, 7 (8, 9, 10) removably installed thereon from above as arranged in a direction. The valve mount 28 (29) comprises an inflow channel forming member 30 (34) having a channel in communication with the inlet of the valve 6 (8) disposed at one end thereof, one or a plurality of communication channel forming members 31 (36, 38) having a channel for causing the outlet of one of the valves 6 (8, 9) to communicate with the inlet of the valve 7 (9, 10) adjacent thereto, and an outflow channel forming member 33 (39) having a channel in communication with the outlet of the valve 7 (10) disposed at the other end of the mount (see Japanese Patent Application No. 278473/1997).

Indicated at 5 (11) in the drawing is a check valve comprising a left valve body 22 (25) having coupling portions 40, 41 (60, 61), a central valve body 23 (26), and a right valve body 24 (27). Indicated at 32 (35, 37) is a subchannel forming member comprising a coupling holding member 47 (51, 53) and a coupling portion 48 (52, 54). The massflow controller 3 has rectangular parallelepipedal extensions 49, 50 provided at the lower end thereof and each formed with a channel having a downward opening. Each on-off valves 6 (7, 8, 9, 10) comprises a valve body 12 (14, 16, 18, 20), and an actuator 13 (15, 17, 19, 21) mounted on the valve body from above for suitably shutting off or opening a channel through the valve body 12 (14, 16, 18, 20). Flanges 12a, 14a, 16a, 18a, 20a provided at the lower ends of the respective valve bodies 12, 14, 16, 18, 20 and rectangular when seen from above are connected to the valve mount 28 or 29 with screws (not shown) driven in from above.

In each shutoff-opening device 1 (2), the channel forming member 30 (38) may comprise a plurality of members 42, 43, 44, 45, 46 (55, 56, 57, 58, 59) in combination so as to have a U-shaped channel. Further the channel forming member 31 (33, 34, 36, 39) may consist only of a blocklike coupling member having a V-shaped channel 31a, (33a, 34a, 36a, 39a). The blocklike coupling members 31, 33, 34, 36, 39 then have the advantage of being reduced in the number of components and easy to heat by a heater.

Fluid control apparatus of the type described are generally used in systems of low pressure difference or systems of great flow rate, and it is desired that the apparatus be reduced in pressure losses to ensure an increased flow rate.

However, as compared with channel forming members having a U-shaped channel, the blocklike coupling members 31, 33, 34, 36, 39 formed with a V-shaped channel 31a, (33a, 34a, 36a, 39a) have a disadvantage from the viewpoint of increasing the flow rate since the diameter of the channel is smaller even if the opening of the channel has the same diameter as that of the U-shaped channel.

SUMMARY OF THE INVENTION

An object of the present invention is to provide a fluid coupling having the advantage of the blocklike coupling member formed with a V-shaped channel and nevertheless free of the factor leading to a reduced flow rate which is the drawback of the blocklike coupling member.

The present invention provides a fluid coupling comprising first and second coupling members each having a gasket holding annular ridge on a butting end face thereof, and an annular gasket interposed between the two coupling members, the fluid coupling being characterized in that at least one of the coupling members has a fluid channel comprising an opening passageway orthogonal to the butting end face thereof, and a slanting main passageway communicating therewith, the opening passageway having a diameter equal to the inside diameter of the annular ridge, the gasket having an inside diameter smaller than the diameter of the opening passageway.

The first and second coupling members may have respective slanting main passageways which are substantially aligned. Alternatively, one of the first and second coupling members may have a main passageway which is orthogonal to the butting end face, with a slating main passageway formed in the other coupling member.

The fluid coupling of the invention wherein the fluid channel is inclined with respect to a direction orthogonal to the butting end face can be increased in flow rate without entailing drawbacks such as wrinkling of the gasket. Accordingly, the coupling retains the advantage of using the block coupling member having a V-shaped channel and is yet free of the cause that would lead to a reduced flow rate which is the drawback of the block coupling member.

BRIEF DESCRIPTION OF THE DRAWINGS

FIGS. 1(a) and 1(b) include sectional views showing a fluid coupling embodying the invention;

FIGS. 2(a) and 2(b) include sectional views showing a fluid coupling or comparison;

DESCRIPTION OF THE PREFERRED EMBODIMENTS

Embodiments of the present invention will be described below with reference to the drawings.

Figure 7:
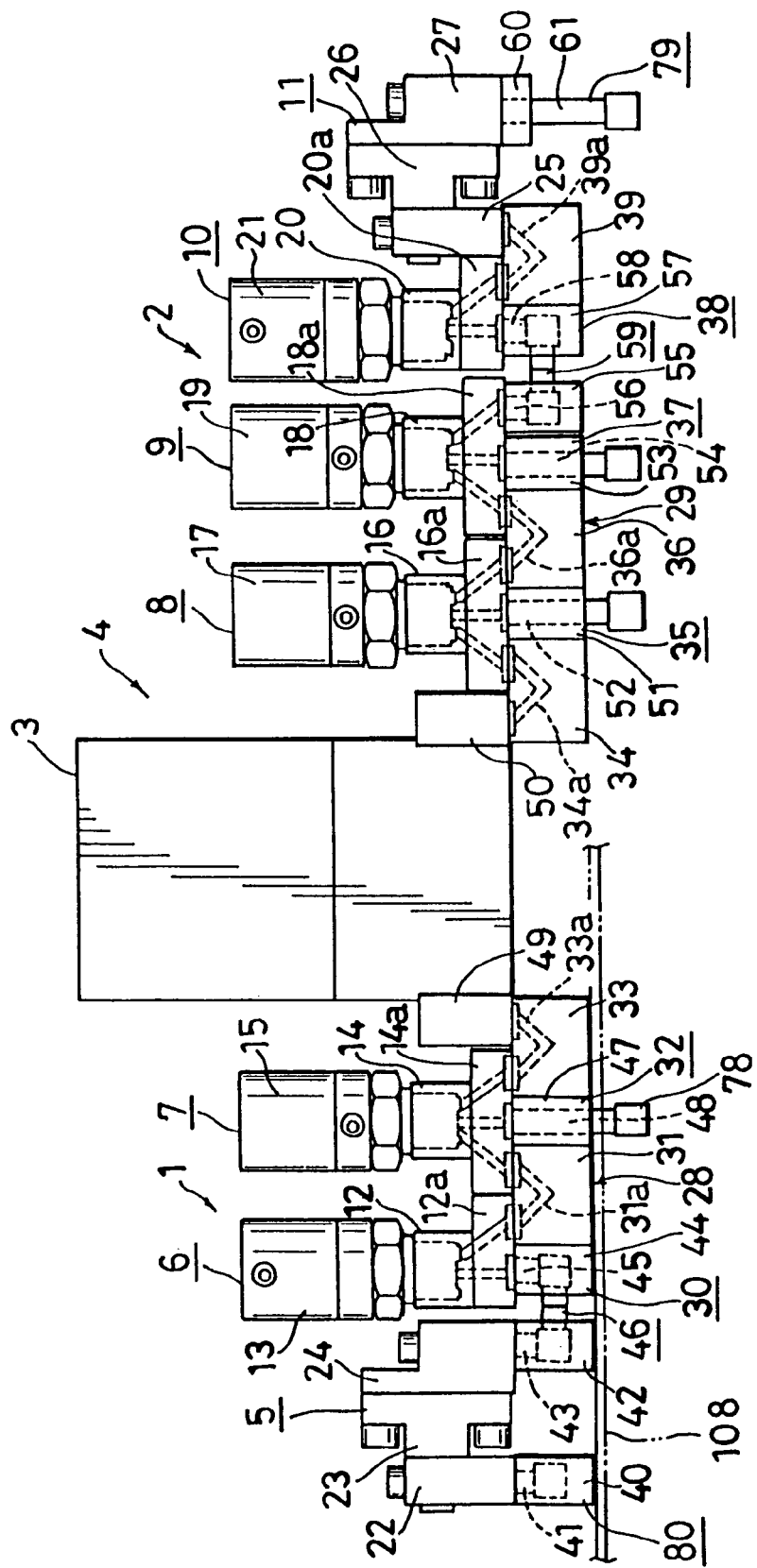
FIG. 7 is a diagram showing a fluid control apparatus for which the fluid coupling of the invention is used.

FIG. 1, sections (a) and (b) show a fluid coupling of the invention; section (a) is an enlarged sectional view of the butting portions of the valve body 12 of the first on-off valve, the valve body 14 of the second on-off valve and the communication channel forming member 31 which are shown in FIG. 7, and section (b) is a sectional view showing the butting portions of the valve body 12 of the first on-off valve and the communication channel forming member 31 on a further enlarged scale.

The valve body 12 of the first on-off valve and the communication channel forming member 31 are formed in their butting end faces with recesses 69, 70, respectively, which are circular in section. Formed on the bottom of each recessed portion 69 (70) is a cylindrical projection 71 (72) having a gasket holding annular ridge 71a (72a) at its outer end. Provided between the two members 12, 31 is an annular gasket 73 held by a retainer 74, which is attached to the outer periphery of the cylindrical projection 72 of the channel forming member 31. The butting portions of the valve body 14 of the second on-off valve and the channel forming member 31 are also constructed in exactly the same manner as described above. The V-shaped channel 31a of the channel forming member 31 is formed by obliquely boring the member 31 at two opening portions and causing the bores to communicate with each other in a butting fashion at a position corresponding to the lower end of the channel 31a.

The construction of the butting portions of the valve body (hereinafter referred to as the "first coupling member") 12 of the first on-off valve and the communication channel forming member (hereinafter referred to as the "second coupling member") 31 will be described below.

The fluid channel 75 (76) of each of the first and second coupling members 12, 31 comprises a short opening passageway 75a (76a) defined by the inner periphery of the cylindrical projection 71 (72) and orthogonal to the butting end face, and a slanting main passageway 75b (76b) communicating with the passageway 75a (76a).

The opening passageway 75a (76a) has a diameter equal to the inside diameter of the gasket holding annular ridge 71a (72a). The gasket 73 has an inside diameter smaller than the diameter of the opening passageway 75a (76a). The main passageway 75b (76b) has a maximum diameter corresponding to the diameter of the opening passageway 75a (76a).

For comparison, FIG. 2, sections (a) and (b) show a fluid coupling (Comparative Example 1) comprising first and second coupling members 12, 31 formed with respective fluid channels 85, 86 and a gasket 83. Each fluid channel 86 (86) comprises an opening passageway 85a (86a) and a slanting main passageway 85b (86b) communicating with the passageway 85a (86a). The opening passageways 85a, 86a have a diameter equal to the inside diameter of the gasket 83. Gasket holding annular ridges 81a, 82a of cylindrical projections 81, 82 have an inside diameter larger than the inside diameter of the gasket 83.

Figure 3:
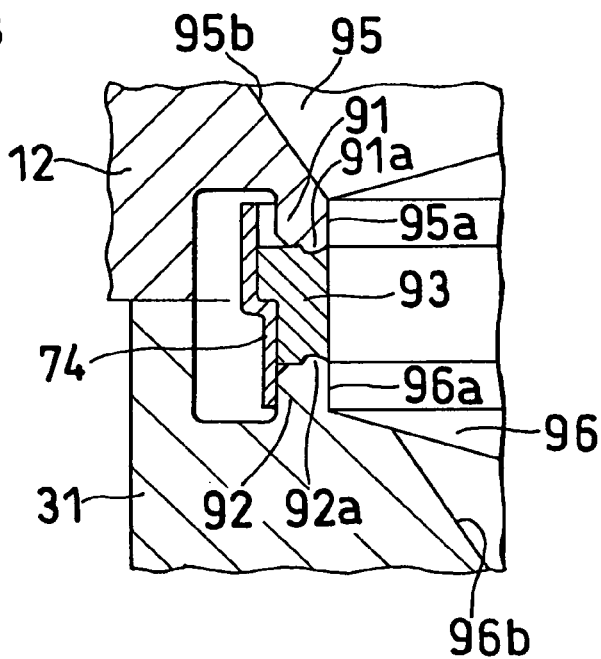
FIG. 3 is a sectional view showing another fluid coupling for comparison.

Further for comparison, FIG. 3 shows a fluid coupling (Comparative Example 2) wherein each fluid channel 95 (96) comprises an opening passageway 95a (96a) and a slanting main passageway 95b (96b) and the opening passageways 95a, 96a have a diameter equal to the diameter of the opening passageways 75a, 76a of the fluid coupling of the invention and also equal to the inside diameter of a gasket 93 and to the inside diameter of gasket holding annular ridges 91a, 92a of cylindrical projections 91, 92.

Table 1 shows the results obtained by comparing the fluid coupling of the invention shown in FIG. 1 with Comparative Examples 1 and 2 shown in FIGS. 2 and 3, respectively.

TABLE 1

|  | Invention | Comp. Ex. 1 | Comp. Ex. 2 |
| --- | --- | --- | --- |
| Channel diameter | 3.3 mm | 2.5 mm | 3.3 mm |
| Flow rate (Cv value) | Increase | Reference | Increase |
| State as tightened up | Good | Good | Wrinkles in gasket |
| Replaceability | Good | Good | Good |

The table reveals that as compared with the main passageways 85b, 86b of Comparative Example 1 having a diameter of 2.5 mm, the main passageways 75b, 76b of the fluid coupling of the invention have an increased diameter of 3.3 mm, i.e., an increase to 1.74 times the channel of the former in channel cross sectional area to ensure an increased flow rate. Although the fluid coupling of Comparative Example 2 is comparable to that of the invention with respect to the increase in flow rate, the comparative coupling has the problem that the inner peripheral portion of the gasket 93 wrinkles when the coupling is tightened up. More specifically stated, stress concentration occurs on opposite end faces of the gasket 93 at its inner peripheral portion as the fluid coupling is tightened up, with the result that even if the coupling is tightened up properly, wrinkles are created. If produced, the wrinkles permit deposition of dirt, causing trouble to the use of the coupling in semiconductor manufacturing equipment or the like which requires a very high degree of cleanliness. With the coupling of the present invention, the gasket holding annular ridges 71a, 72a are in contact with the gasket 73 at its radial midportion, so that the inner peripheral portion of the gasket 73 is free of stress concentration and therefore develops no wrinkles.

Because the main passageways 75b, 76b have an increased diameter, the fluid coupling of the invention is improved in gas replaceability. When checked by passing a process gas through the coupling first, and thereafter replacing the gas with a purge gas to measure the time required for the replacement, the coupling was found very satisfactory in gas replaceability. This reveals that the invention achieves an increased flow rate without entailing drawbacks such as occurrence of wrinkles in the gasket 73.

Figure 4:
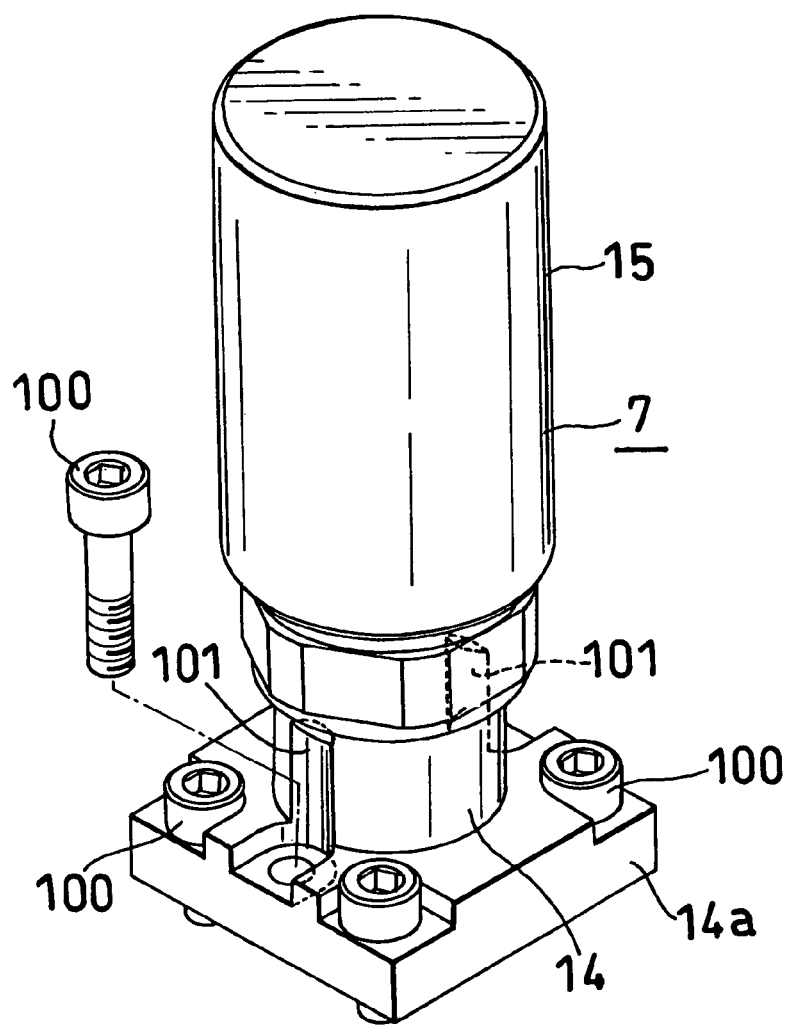
FIG. 4 is a perspective view showing a preferred embodiment of on-off valve.
Figure 5:
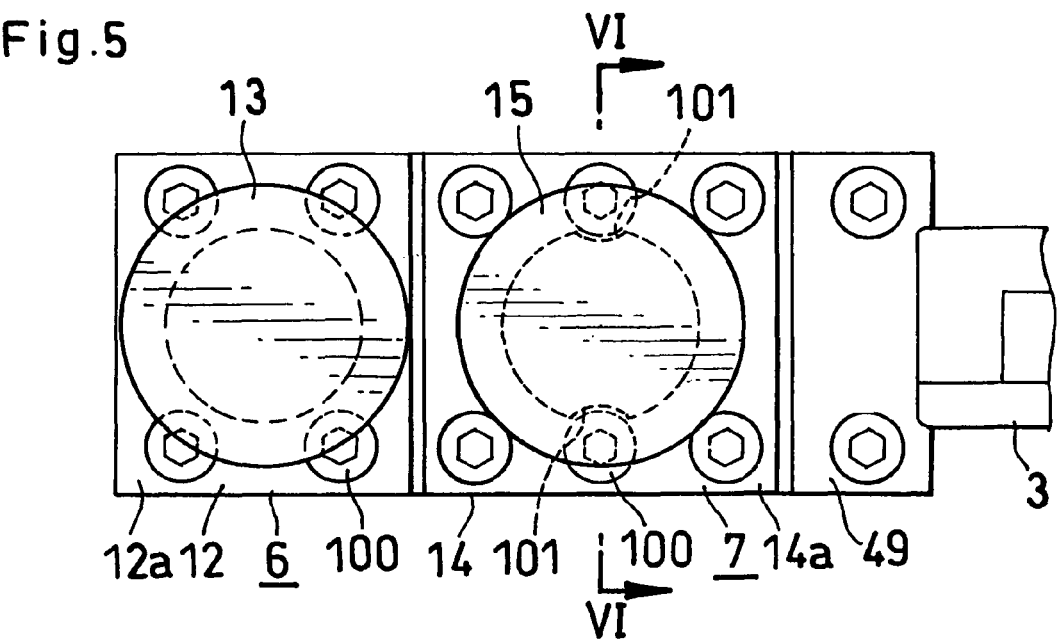
FIG. 5 is a fragmentary plan view showing a fluid control apparatus comprising the on-off valve of FIG. 4.
Figure 6:
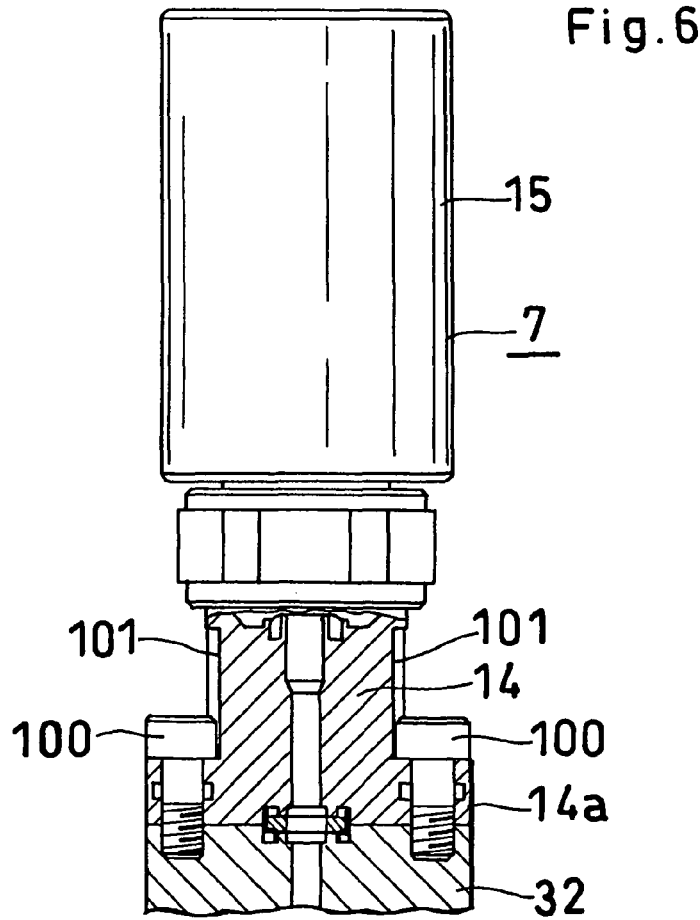
FIG. 6 is a view in section taken along the line VI-VI in FIG. 5.

FIGS. 4 to 6 show a preferred embodiment of second on-off valve 7.

With reference to FIG. 5, a first on-off valve 6 is fastened to a valve mount 28 by driving screws 100 into the mount through the four corners of a flange 12a provided at the lower end of a valve body 12 and rectangular when seen from above. A second on-off valve 7 is fastened to the valve mount 28 by driving screws 100 into the mount through the four corners and midportions of opposite side edge portions of a flange 14a provided at the lower end of a valve body 14 and rectangular when seen from above. As seen in FIGS. 4 and 6, the solid cylindrical valve body 14 of the second on-off valve 7 has an outer peripheral wall which is vertically counterbored as at 101 for the screws 100 driven in through the side edge midportions of the flange 14a.

The use of the second on-off valve 7 thus constructed makes it possible to increase the diameter of the flow channel of the valve body 14 without increasing the size of the valve body 14 and to attain an increased flow rate without making the fluid control apparatus large-sized. Furthermore existing fluid control apparatus can be modified to partly incorporate therein the above construction of increased flow rate.

What is claimed is:

1. A fluid coupling comprising:

first and second coupling members having respective gasket holding annular ridges on butting end faces thereof; and an annular gasket interposed between the first and second coupling members, wherein at least one of the first and second coupling members has a fluid channel comprising an opening passageway orthogonal to the butting end face thereof, and a slanting main passageway communicating therewith, the opening passageway having a diameter equal to the inside diameter of the gasket holding annular ridge, wherein the gasket holding annular ridges are rounded so as to be in contact with flat, non-inclined faces of the gasket only at its radial midportion so as to relieve the inner peripheral portion of the gasket from stress concentration and wrinkles and, wherein the gasket has an inside diameter less than the diameter of the opening passageway.

\* \* \* \* \*